UNITED STATES PATENT OFFICE.

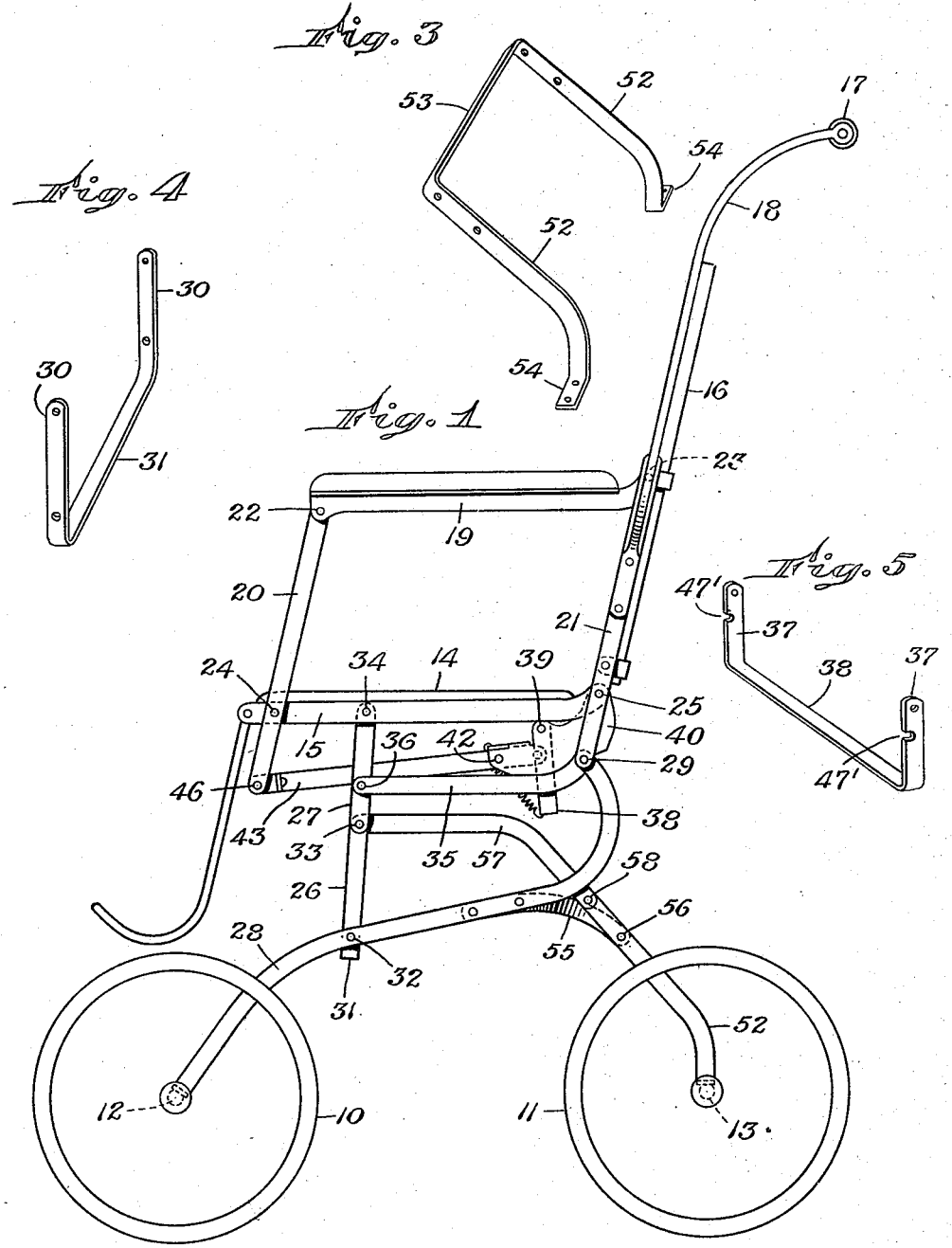

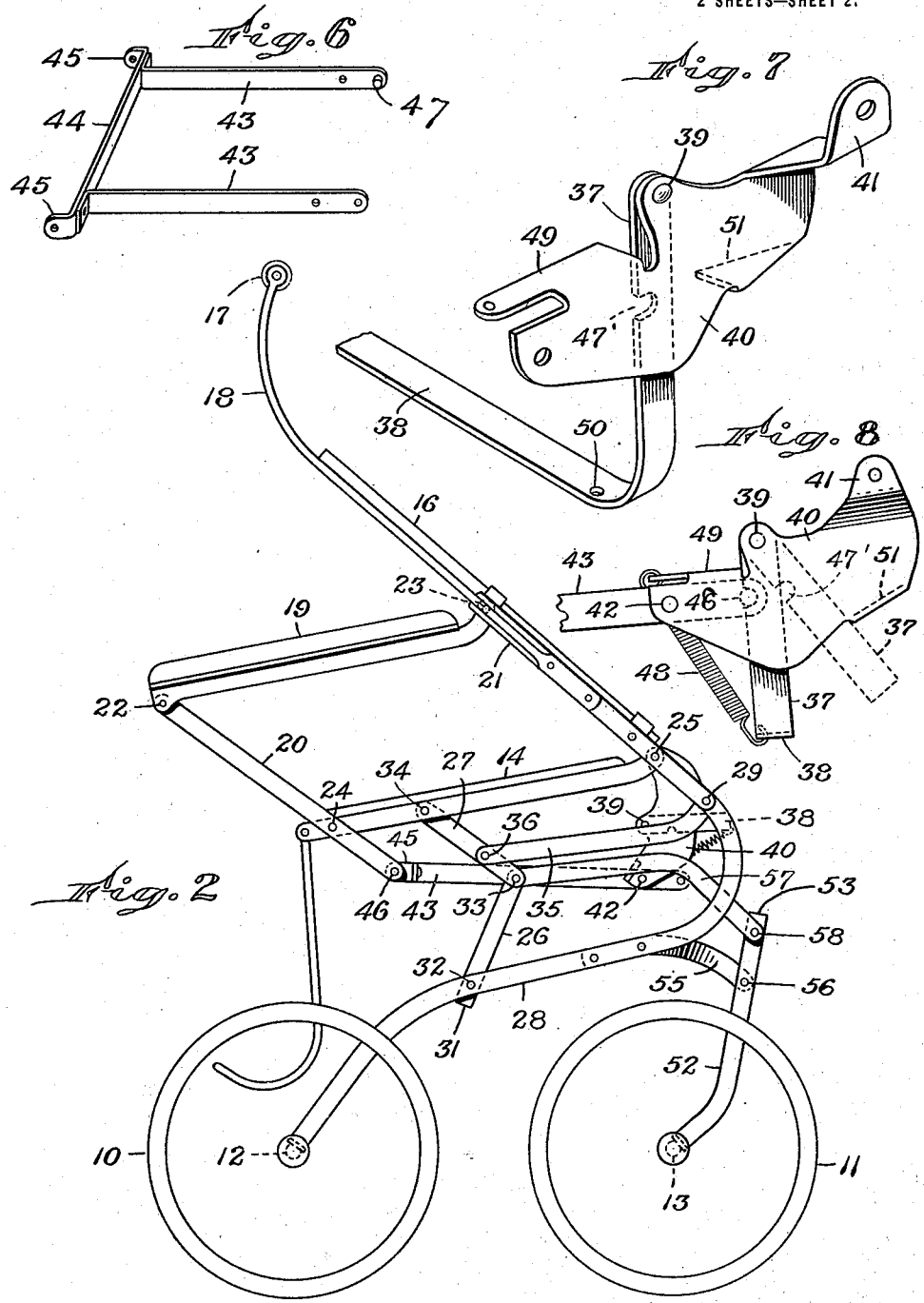

ORA N. TURNER, OF TEMPLETON, MASSACHUSETTS, ASSIGNOR TO BAY STATE METAL WHEEL COMPANY, OF TEMPLETON, MASSACHUSETTS, A CORPORATION OF MAINE.

PERAMBULATOR.

1,140,085.

Specification of Letters Patent.

Patented May 18, 1915.

Application filed April 4, 1913. Serial No. 758,852.

*To all whom it may concern:*

Be it known that I, ORA N. TURNER, a citizen of the United States, and resident of Templeton, in the county of Worcester and State of Massachusetts, have invented certain new and useful Improvements in Perambulators, of which the following is a specification.

This invention relates to folding perambulators.

Of the accompanying drawings: Figure 1 represents a side elevation of a perambulator embodying the present invention, the same being open for use. Fig. 2 represents a similar elevation, showing the perambulator in a position about half way between full open and full closed positions. Fig. 3 represents a perspective view of that portion of the running frame which is secured to the rear axle. Fig. 4 represents a perspective view of a toggle member for supporting the seat. Fig. 5 represents a perspective view of a locking member which locks the parts in operative position and which may be used as a handle for carrying the perambulator when closed. Fig. 6 represents a perspective view of locking members which coöperate with the device shown by Fig. 5. Fig. 7 represents a perspective view including one end of the locking member shown by Fig. 5, and a toggle plate which connects the structure shown by Fig. 6 with the seat frame. Fig. 8 represents a side elevation of the structure included in Fig. 7, with the addition of a portion of structure shown by Fig. 6.

The same reference characters indicate the same parts wherever they occur.

The perambulator has two front wheels such as that indicated at 10 and two rear wheels such as that indicated at 11, these wheels being mounted respectively upon axles 12 and 13. The gage of the front wheels may be the same as that of the rear wheels, thus permitting the front and rear wheels to "track". The seat is indicated at 14 and is attached to a seat frame 15. A back-rest is indicated at 16, and a handle indicated at 17 is supported by and connects two push-rods such as that indicated at 18. Arm-rests such as that indicated at 19 are supported by levers 20 at the front and levers 21 at the rear. The push-rods 18 are affixed to the levers 21. The pivot 22 connects the front lever 20 with the arm-rest, and the pivot 23 connects the lever 21 with the arm-rest. Pivots 24 and 25 connect the levers 20 and 21 respectively with the seat frame 15. For convenience of description the pivot 25 is hereinafter termed the main fulcrum. The seat frame, arm-rests and arm-rest-supporting levers 20 and 21 form a parallelogram which is collapsible in such manner as to enable the levers to swing forwardly and downwardly to substantially parallel relation with the seat 14.

The forward portion of the seat frame is supported by toggle members 26, 27, and these in turn are supported by reaches 28 which extend from the front axle to the lower ends of the levers 21. The forward ends of the reaches are affixed to the front axle, and the rear ends are connected with the levers 21 by pivots 29. The toggle 26 as shown by Fig. 4 is made of a single continuous strip which is bent to form upright supporting portions 30, 30, and a transverse connecting portion 31. This member is pivotally connected to the reaches 28 by pivots 32, the transverse portion 31 serving as a strut for bracing the reaches against lateral stress and preserving the desired distance between them. The free ends of the portions 30 are connected with the toggles 27 by pivots 33, and the toggles 27 are connected with the seat frame by pivots 34.

The seat-supporting toggles just described are operated by the rear levers 21 through the medium of connecting links 35. The rear ends of the links 35 are mounted upon the pivots 29, and the forward ends are connected by pivots 36 with the toggles 27. When the handle 17 swings forwardly about the main fulcrum 25, the pivots 29 swing to the rear, thus moving the links 35 to the rear and operating the toggles 26, 27, so as to draw the seat and front wheels toward each other.

The parts are locked in open position by a locking member shown separately by Fig. 5. This member is made from a continuous strip which is bent to form levers 37 and a transverse connecting portion 38 which serves as a handle. This locking member is connected by pivots 39 with toggle plates 40 (see Fig. 7). Two of these plates of right and left formation are pivotally mounted upon the main fulcrum pivots 25, being provided with ears 41 for such connections. The plates 40 are connected by pivots 42 with toggle links 43 whose forward ends are preferably connected as shown by Fig. 6. The connection is made by a transverse bar 44 whose ends are bent to form ears 45. These ears are pivotally connected by pivots 46 with the lower ends of the arm-supporting levers 20.

When the handle 17 is swung forwardly toward closed position, the lower ends of the levers 20 swing toward the rear, and this movement is transmitted by the toggle links 43 to the toggle plates 40, which are swung thereby about the main fulcrum 25. This causes an angular movement of the plates 40 relatively to the links 43, and it is by preventing such relative movement that the locking member shown by Fig. 5 is adapted to lock the parts in operative position. For this purpose the locking toggles 43 are extended to the rear beyond the pivots 42 and are provided with locking studs or projections 47 which are adapted to occupy notches 47' formed in the front edges of the locking levers 37. The parts as shown by Fig. 1 and Fig. 8 are locked, but the releasing position of the locking member is shown by dotted lines. The locking member is normally held in locking position by a spring or springs such as that indicated at 48. For convenience in mounting the springs, the toggle plates 40 are formed with ears 49, the same being pierced to receive the springs as shown by Fig. 8. The handle 38 of the locking lever is also pierced, as indicated at 50, to receive the springs, which may be hooked in as shown by Fig. 8. The ears 49 serve also as stops for determining the locking position of the locking member. As shown by Figs. 7 and 8, the forward edges of the portions 37 are against the ears 49. The toggle plates 40 are provided with ears 51 against which the rear edges of the portions 37 strike when the locking member is retracted to release the studs 47. As shown by dotted lines in Fig. 8, the locking member in its retracted position is against the ear 51. The ears 51 facilitate the desired relative movement of the toggles 43 and toggle plates 40 when the locking member is against the ears. For example, a person standing behind the perambulator grasps the handle 38 and lifts the same, thereby tipping the perambulator forward and lifting it bodily from the ground. The locking member is thus retracted against the stop 51 and releases the studs 47. By reason of its engagement with the ears, the handle 38 acts as if it were a rigid part of the toggle plates 40, and swings the plates about the main fulcrum 25 in the direction corresponding to closing movement of the parts. The weight of the push handle 17 and arm-rests acts in conjunction with the stress upon the toggle plates to move the parts to closed position.

The grip first taken upon the handle 38 may be retained for the purpose of carrying the perambulator, which automatically folds itself into a compact condition without requiring any other act than that of lifting the handle 38. The opening and locking of the parts is effected automatically by gravity when the perambulator is supported solely by the handle 17.

When the parts are moved from closed position to operative position, the locking studs 47 traverse the front edges of the locking levers 37 and force the levers back until the studs register with the notches 47'. The springs 48 then draw the locking member forward, and the locking toggles 43 and 40 thus become automatically locked relatively to each other.

The rear axle 13 is affixed to a section of the running-frame which is shown in perspective by Fig. 3. This part is made of a continuous strip which is bent to form reaches 52 and a transverse connecting portion 53. The ends of the strip are bent to form ears 54, which ears rest upon and are riveted or otherwise secured to the axle. This same form of connection is preferably employed for connecting the front axle and the reaches 28. The front and rear sections of the running frame are connected by brackets 55. These brackets are affixed to the reaches 28 and are connected with the reaches 52 by pivots 56. The parts are so disposed that when the perambulator is in operative position the transverse connecting portion 53 rests upon the brackets 55, the parts thus coöperating to render the front and rear sections of the running-frame self-supporting at the joint. The rear section swings about the pivots 56 in such manner that the rear wheels approach the front wheels when the perambulator is closed, and recede from the front wheels when it is opened. The seat-supporting toggles and rear section of the running-frame are connected by links 57, the forward ends of the links being mounted upon the pivots 33, and the rear ends being connected to the reaches 52 by pivots 58. The tendency of the framework to fold automatically when the perambulator is lifted by the handle 38 is further increased by the weight of the rear wheels. When the perambulator is lifted by the handle 38 the perambulator assumes a position in which the rear axle is almost directly over the front axle and in which the reaches 52 are substantially horizontal. While the perambulator is thus suspended by the handle 38, and when the locking parts are unlocked, the rear wheels act as weights and the reaches 52 act as levers using the pivots 56 for their fulcrum for actuating the toggles 26, 27. The folding operation may be readily understood by turning the sheet bearing Fig. 2 so that the handle 38 is at the top. The weight of the push handle and the arm-rests acting through the medium of the levers 21 and links 35 coöperates with the weight of the rear wheels acting through the reaches 52 and links 57 to cause the desired movement of the toggles 26 and 27.

When the perambulator is fully closed, the rear axle engages the reaches 28, and the seat frame approaches the reaches 28 so closely that it is separated therefrom only by the ears 45. The rear wheels do not touch the front wheels, because the length of the reaches 52 from the pivots 56 to the rear axle is too short to permit the wheels to touch. The wheels are operative for supporting and for enabling the perambulator to roll when it is closed as well as when it is open. If it is set upon its wheels when closed, the reaches 28 bear directly upon the rear axle, and the superstructure is thus rigidly supported and the wheels left free to turn.

I claim:

1. A folding perambulator comprising wheel axles, frame elements fastened respectively to said axles and connected to each other by a pivotal joint arranged to enable said axles to move toward and from each other, jointed elements carried by said frame elements, and a seat carried by said jointed elements, said jointed elements being connected to said frame elements by pivot connections arranged to cause bodily movement of said seat toward said frame elements as said axles move toward each other.

2. A folding perambulator having wheel axles movable toward and from each other, a folding running frame connecting said axles, and folding seat-supporting means connected to said frame so as to fold in unison therewith, said frame being arranged to move said seat-supporting means bodily toward said axles as said axles approach each other.

3. A folding perambulator having wheel axles movable toward and from each other, a folding running frame connecting said axles, and folding seat-supporting means pivotally connected to said means so as to be folded and moved bodily toward said axles by said running frame as said axles approach each other.

4. A folding perambulator comprising a running frame having front and rear sections and wheel axles secured respectively to said sections, said frame being capable of folding to move said axles toward each other, and folding seat-supporting means connected to said front and rear sections so as to be moved bodily toward said axles as said axles approach each other.

5. A folding perambulator comprising a running frame having front and rear sections and wheel axles secured respectively to said sections, said sections being relatively movable to carry said axles toward and from each other, and folding seat-supporting means connected to said front and rear sections to be folded into more compact form and moved bodily toward said axles as said axles approach each other.

6. A folding perambulator comprising a folding running frame having front and rear sections including wheel axles, said sections being movably connected so that the axles are movable toward and from each other, a seat, folding seat-supporting means mounted exclusively upon one of said running frame sections, and means connecting the other running frame section with said seat-supporting means for causing said seat-supporting means and said running frame to fold in unison.

7. A folding perambulator comprising a folding running frame consisting of front and rear sections, front and rear wheel axles affixed respectively to said front and rear sections, said sections being movably connected so that the wheel axles are movable toward and from each other, a seat, toggle members mounted upon said running frame for supporting the seat, and means operable by folding movement of said running frame for operating said toggles.

8. A folding perambulator comprising a folding running frame consisting of front and rear sections, said sections having front and rear axles respectively, a seat, seat-supporting toggles mounted exclusively upon one of said running frame sections, and means connecting said toggles with the other of said running frame sections for causing the toggles and running frame to collapse in unison.

9. A folding perambulator comprising a folding running frame consisting of relatively movable sections, a seat, seat-supporting toggles pivotally connected to one section of the running frame, and means connecting the other section of the running frame and said toggles for positioning the toggle joints substantially in alinement with each other when the perambulator is in operative position.

10. A folding perambulator comprising a folding running frame, a seat, seat-supporting toggles mounted on said running frame, and means for holding the intermediate joint of said toggles substantially in alinement with the outer toggle joints when the running frame is in operative position.

11. A folding perambulator comprising a folding running frame consisting of front and rear sections having front and rear wheels respectively, said sections being pivotally connected on a transverse axis which is farther from the nearest point of the front wheels than from the farthest point of the rear wheels, whereby the rear wheels may be arranged to track with the front wheels without touching the same when said frame is folded.

12. A folding perambulator comprising a folding running frame consisting of front and rear sections pivotally connected on a transverse axis, a seat frame, toggles for supporting said seat frame, said toggles being pivotally connected to said running frame in front of said axles, and means connecting said running frame and said toggles for causing them to fold in unison.

13. A folding perambulator comprising a folding running frame, a seat, seat-supporting toggles pivotally mounted on said frame so as to render the seat bodily movable with relation to the running frame, means connecting said running frame and toggles for causing them to fold in unison, and means for locking the toggles and running frame in operative position.

14. A folding perambulator comprising a seat frame, folding means for supporting said frame, arms and supports therefor pivoted to the seat frame and connected to said seat-supporting means so as to fold therewith, toggle members pivotally connected to said seat frame and arm supports so as to fold in unison with said arm supports and seat-supporting means, and means for locking said toggle members relatively to each other, whereby said arm supports and seat-supporting means are locked in operative position.

15. A folding perambulator comprising wheel axles, a seat, folding seat-supporting means carried by said axles, means arranged to lock said seat-supporting means in operative position, and a handle carried by said locking means, said locking means being arranged to unlock said seat-supporting means in consequence of lifting said perambulators by said handles, and said seat-supporting means being arranged to fold automatically in consequence of lifting said perambulator by said handle as aforesaid.

In testimony whereof I have affixed my signature in presence of two witnesses.

ORA N. TURNER.

Witnesses:
  CHARLES A. HARWOOD,
  FRED E. DEPINET.

Copies of this patent may be obtained for five cents each, by addressing the "Commissioner of Patents, Washington, D. C."

It is hereby certified that in Letters Patent No. 1,140,085, granted May 18, 1915, upon the application of Ora N. Turner, of Templeton, Massachusetts, for an improvement in "Perambulators," errors appear in the printed specification requiring correction as follows: Page 4, line 11, for the word "axles" read *axis;* same page, line 44, for the word "handles" read *handle;* and that the said Letters Patent should be read with these corrections therein that the same may conform to the record of the case in the Patent Office.

Signed and sealed this 1st day of June, A. D., 1915.

[SEAL.]

J. T. NEWTON,
*Acting Commissioner of Patents.*